(Model.)
J. H. BEIDLER.
COFFEE ROASTER.
No. 247,003. Patented Sept. 13, 1881.
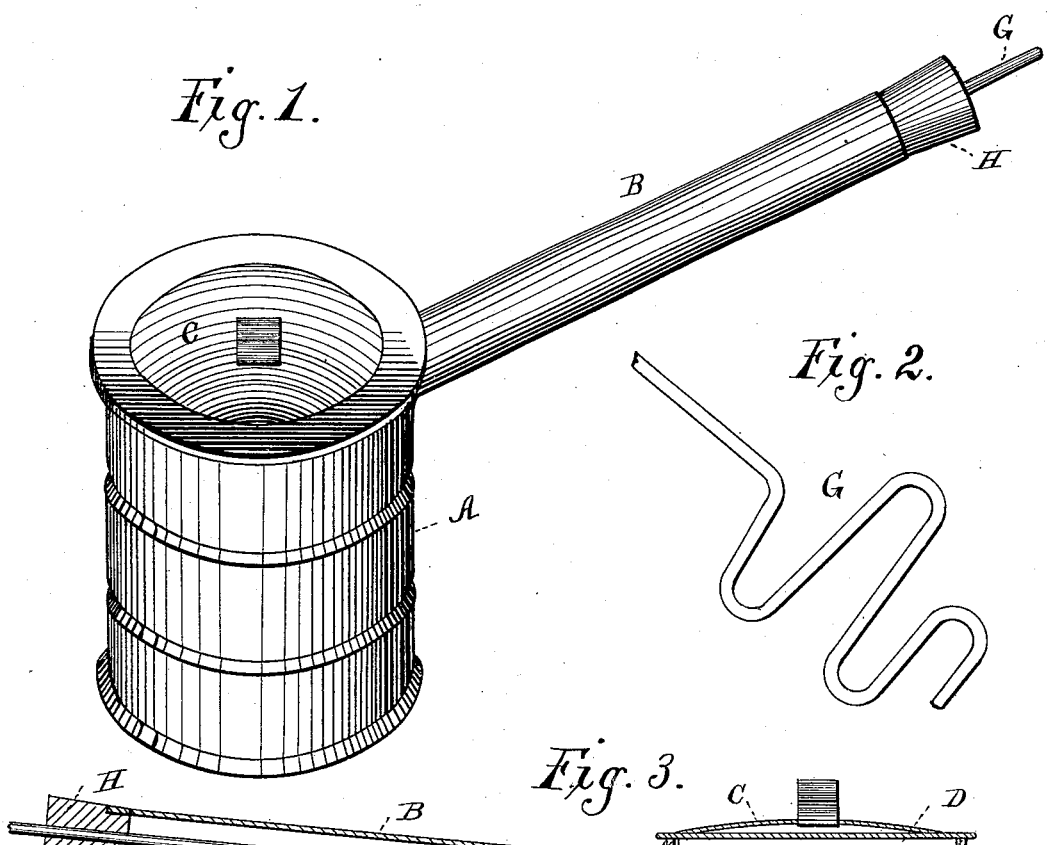
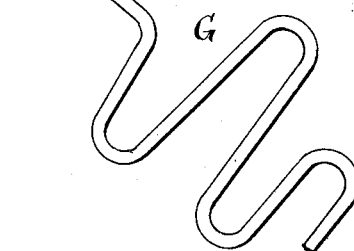
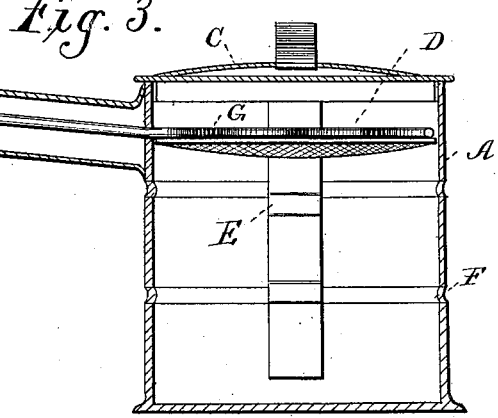
Witnesses,
Edwin L. Yewell,
J. J. McCarthy.
Inventor.
Jacob H. Beidler,
By C. M. Alexander
Atty.

UNITED STATES PATENT OFFICE.

JACOB H. BEIDLER, OF MOUNT PULASKI, ILLINOIS.

COFFEE-ROASTER.

SPECIFICATION forming part of Letters Patent No. 247,003, dated September 13, 1881.

Application filed June 21, 1881. (Model.)

*To all whom it may concern:*

Be it known that I, JACOB H. BEIDLER, of Mount Pulaski, in the county of Logan, and in the State of Illinois, have invented certain new and useful Improvements in Coffee-Roasters; and I do hereby declare that the following is a full, clear, and exact description thereof, reference being had to the accompanying drawings, and to the letters of reference marked thereon, making a part of this specification.

This invention has for its object to provide an apparatus whereby coffee may be roasted in an atmosphere of hot air without coming in contact with directly-heated surfaces, whereby all liability to scorching or burning will be obviated. These objects I attain by the apparatus illustrated in the accompanying drawings, in which—

Figure 1 represents a perspective view of my apparatus; Fig. 2, a detached view of the stirrer; and Fig. 3, a vertical sectional view of the apparatus.

The letter A indicates a cylindrical or other shaped vessel, constructed of suitable material, having a hollow handle, B, and removable top C.

The letter D indicates a foraminous diaphragm, upon which the coffee to be roasted is placed. This diaphragm is supported upon lugs E, or upon internal beads, F, formed on the wall of the vessel.

G indicates a stirrer, which extends through the hollow handle and over the diaphragm, by means of which the coffee may be agitated. The said stirrer passes through a cork, H, the said cork serving to prevent the escape of gases from the coffee, thus preserving its full strength.

Instead of a single diaphragm, several may be employed when it is desired to roast large quantities of coffee.

To use the apparatus the green coffee is placed upon the diaphragm and the vessel is closed. It is then heated in any convenient manner until the coffee has been properly roasted.

Having described my invention, what I claim is—

In combination with the vessel, its diaphragm, and hollow handle, the reciprocating stirrer extending through the handle, substantially as and for the purposes specified.

In testimony that I claim the foregoing I have hereunto set my hand this 13th day of June, 1881.

JACOB H. BEIDLER.

Witnesses:
S. LINN BEIDLER,
R. F. BUCKLES.